United States Patent [19]
Wiesener

[11] 3,780,571
[45] Dec. 25, 1973

[54] REACTOR VESSEL INSPECTION DEVICE

[75] Inventor: Robert W. Wiesener, Roseville, Minn.

[73] Assignee: Programmed & Remote Systems Corporation, St. Paul, Minn.

[22] Filed: Apr. 22, 1971

[21] Appl. No.: 136,411

[52] U.S. Cl........ 73/67.8 S, 95/11 HC, 181/0.5 BE, 73/71.5
[51] Int. Cl. .......................................... G01n 29/04
[58] Field of Search............... 73/67.5, 67.7, 67.8 R, 73/67.8 S, 67.9, 151; 95/11 HC; 181/0.5 BE; 250/83.6 W

[56] References Cited
UNITED STATES PATENTS

| | | | |
|---|---|---|---|
| 2,940,305 | 6/1960 | Williams et al. | 73/67.8 |
| 3,111,027 | 11/1963 | Moffatt et al. | 73/67.8 |
| 3,517,768 | 6/1970 | Straus | 181/.5 |
| 3,534,591 | 10/1970 | Phelan | 73/71.5 |
| 3,555,888 | 1/1971 | Brown | 73/67.8 |
| 3,614,891 | 10/1971 | Nolte | 73/151 |

Primary Examiner—Richard C. Queisser
Assistant Examiner—Arthur E. Korkosz
Attorney—Dugger, Peterson, Johnson & Westman

[57] ABSTRACT

A device for in place inspecting nuclear reactor pressure vessels and which can be removed from the vessel when the vessel is in service. The device can be utilized to inspect the vessel during routine maintenance. Further, the device is mounted so that its position and movements can be repeated on subsequent inspections, and by proper recording of data from initial inspections, defects, cracks, or other hazardous situations can be discovered.

15 Claims, 14 Drawing Figures

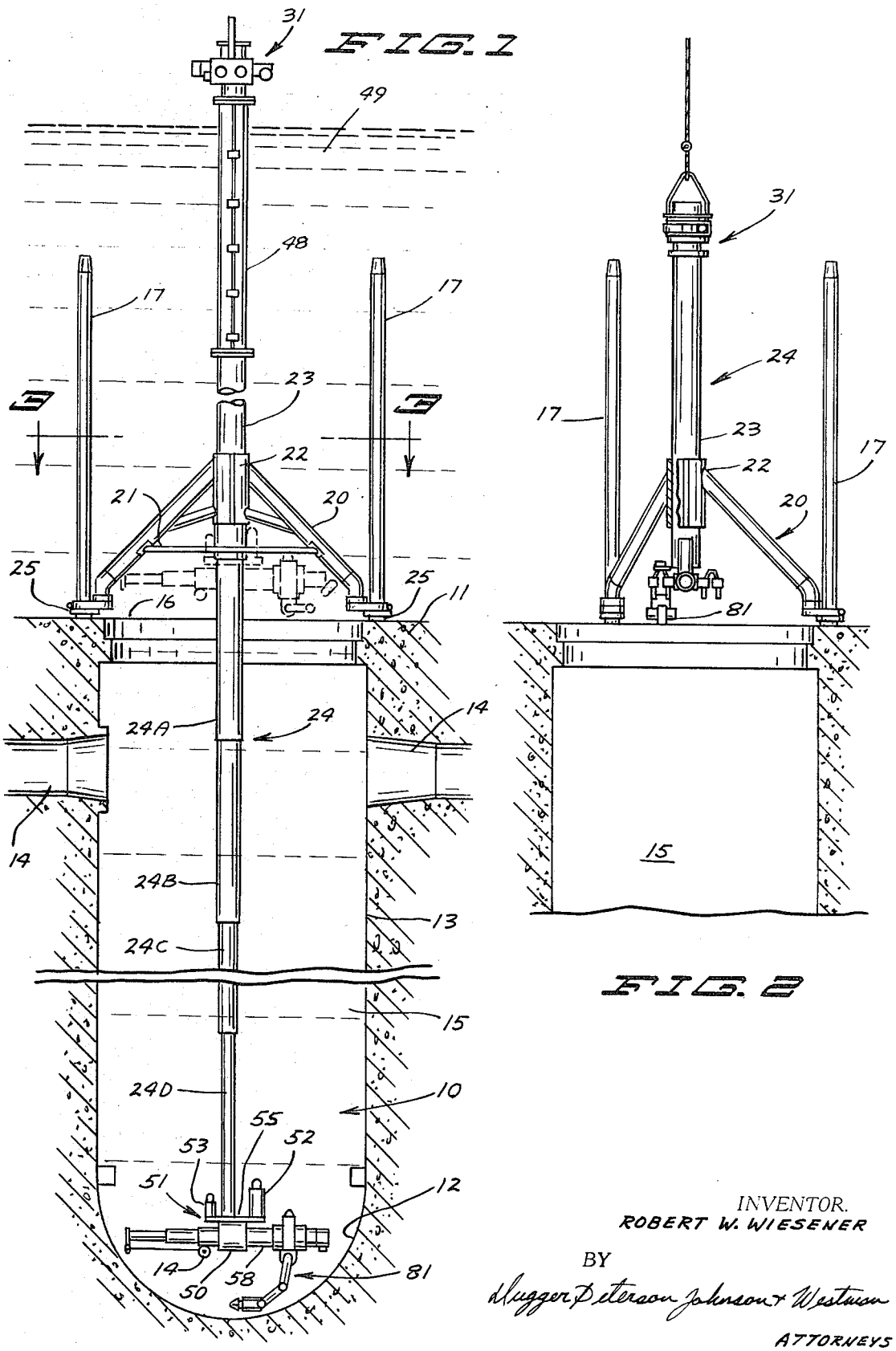

INVENTOR.
ROBERT W. WIESENER

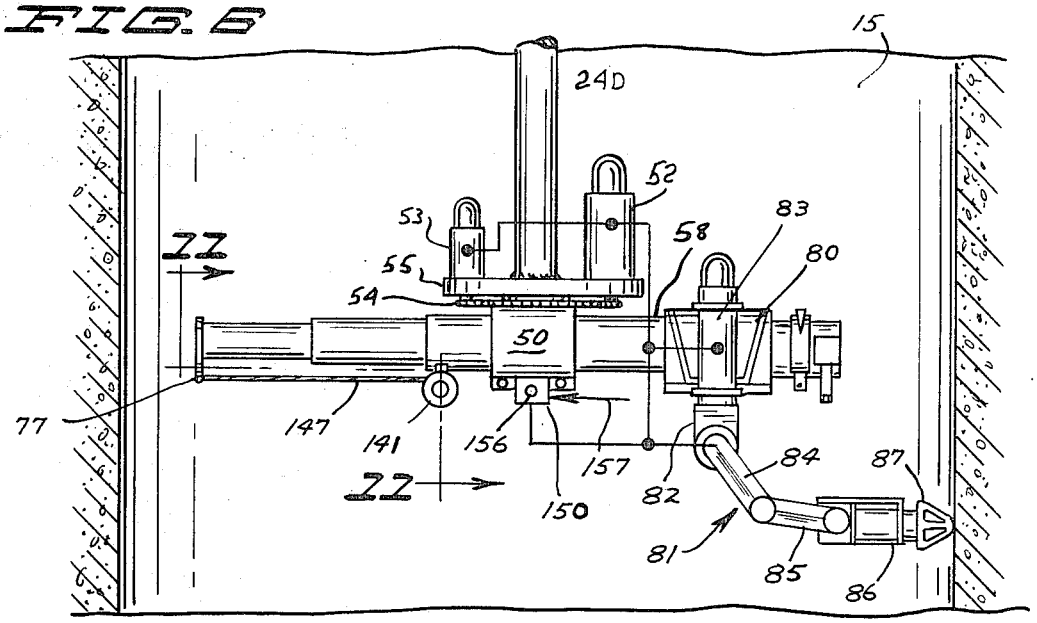
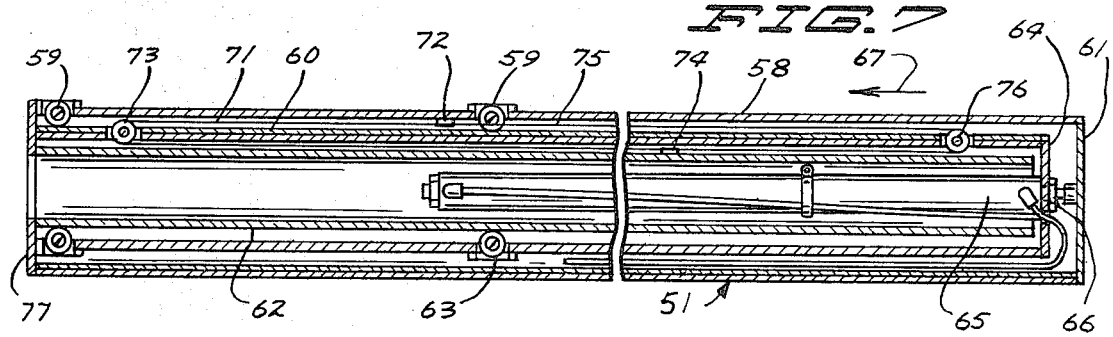
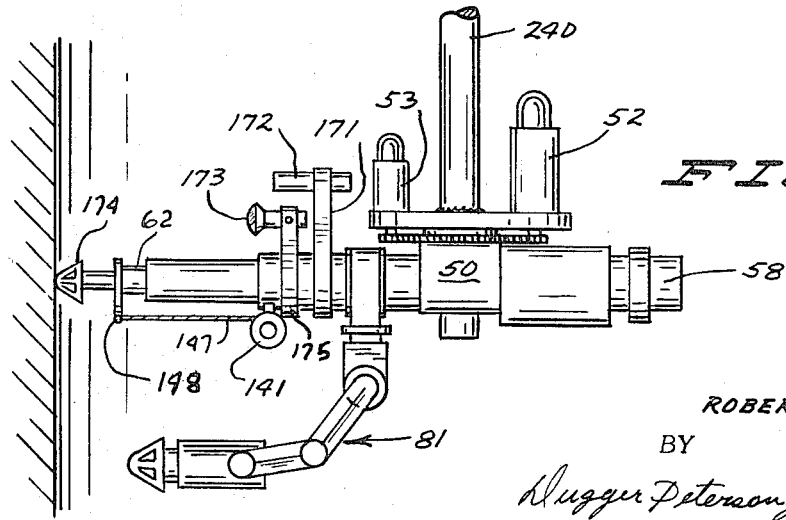
INVENTOR.
ROBERT W. WIESENER
BY
Dugger Peterson Johnson & Westman
ATTORNEYS

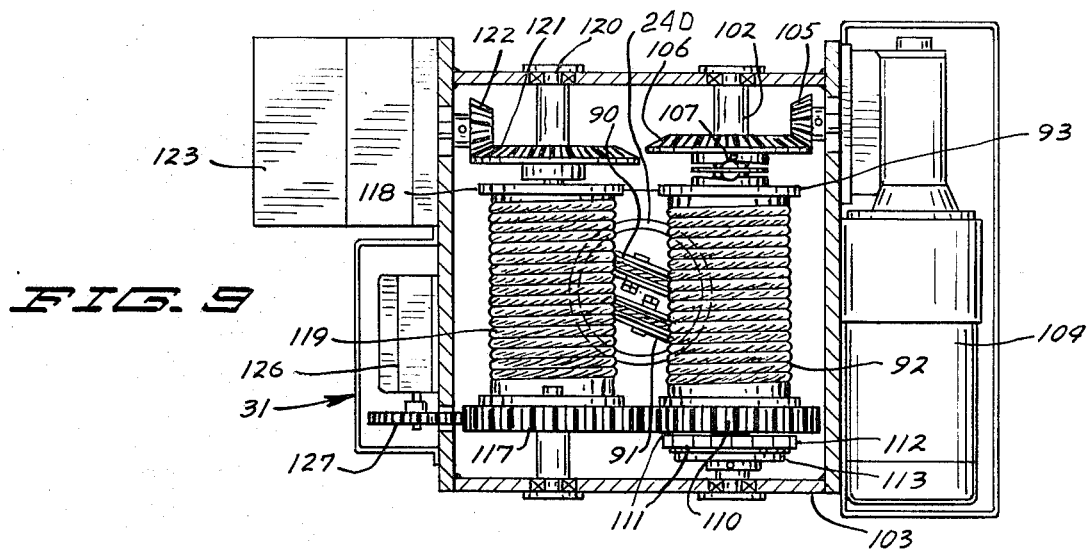
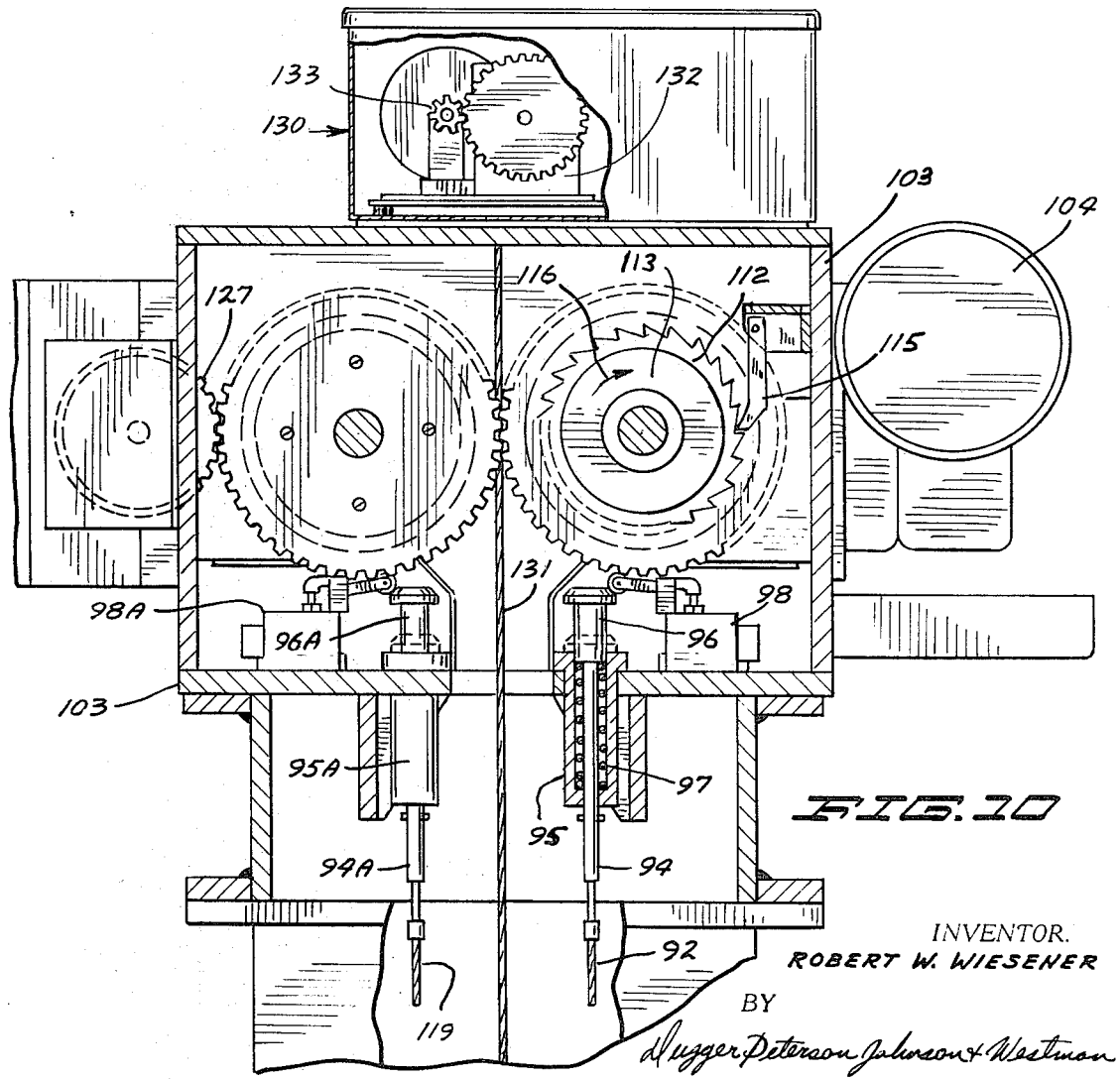

INVENTOR.
ROBERT W. WIESENER

REACTOR VESSEL INSPECTION DEVICE

BACKGROUND OF THE INVENTION

1. Field of the Invention

The present invention relates to equipment for inspecting large fixed installations which require comparative inspections at spaced intervals.

2. Prior Art

The prior art of course, generally shows manipulator structures that are mounted in a variety of units for handling nuclear material, and for use in and around nuclear installations. The present device however utilizes mounting means, and other features to make it adaptable specifically for nuclear reactor pressure vessels, and other vessels that have to be inspected, and wherein the inspecting equipment such as the manipulator arm and mounting members are removed during operation of the vessel to be inspected.

SUMMARY OF THE INVENTION

The present invention relates to an inspection device for large vessels. The device includes support members which can be removed from the vessel when the vessel is in use, and later replaced in the same position to make comparative inspections. The device includes means for handling inspection equipment, such as cameras, ultrasonic detectors or the like, and is movable in several motions to permit it to operate in all areas of the vessel.

The position of the inspection unit and the movements thereof are coded and can be recorded so that the respective position of the inspection device can be determined and repeated at a later time so that the inspection information is accurate. The unit is made so that it will operate under water that is normally used for cooling reactor pressure vessels, in particular, without having elaborate arrangements for sealing, and without using pressurizing air under high pressure differentials. The unit has redundancy in its lifting hoist, by a unique system of winches. The motions provide movement into recesses, and all along the surfaces of the reactor vessel itself.

It is therefore an object of the present invention to present a device which can be used for inspection of large equipment such as pressure vessels, and can be removed, and remounted in precise position to repeat a previous inspection, for comparison purposes at a later time.

BRIEF DESCRIPTION OF THE DRAWINGS

FIG. 1 is a side elevational view with a nuclear reactor pressure vessel shown in section, and an inspection device made according to the present invention installed thereon;

FIG. 2 is a fragmentary view of the inspection device of FIG. 1 with an extension tube removed and shown retracted from the pressure vessel;

FIG. 6 is a fragmentary side elevational view of an installation showing an inspection device of the present invention installed in a nuclear reactor pressure vessel;

FIG. 7 is a vertical sectional view of a mounting tube assembly used with the present invention;

FIG. 8 is a side elevational view of another typical inspection installation utilized with the present invention;

FIG. 9 is a sectional view of the hoist drum assembly utilized for raising and lowering the inspection device of the present invention;

FIG. 10 is an end view of FIG. 9 with parts in section and parts broken away;

DESCRIPTION OF THE PREFERRED EMBODIMENT

Figure 3:
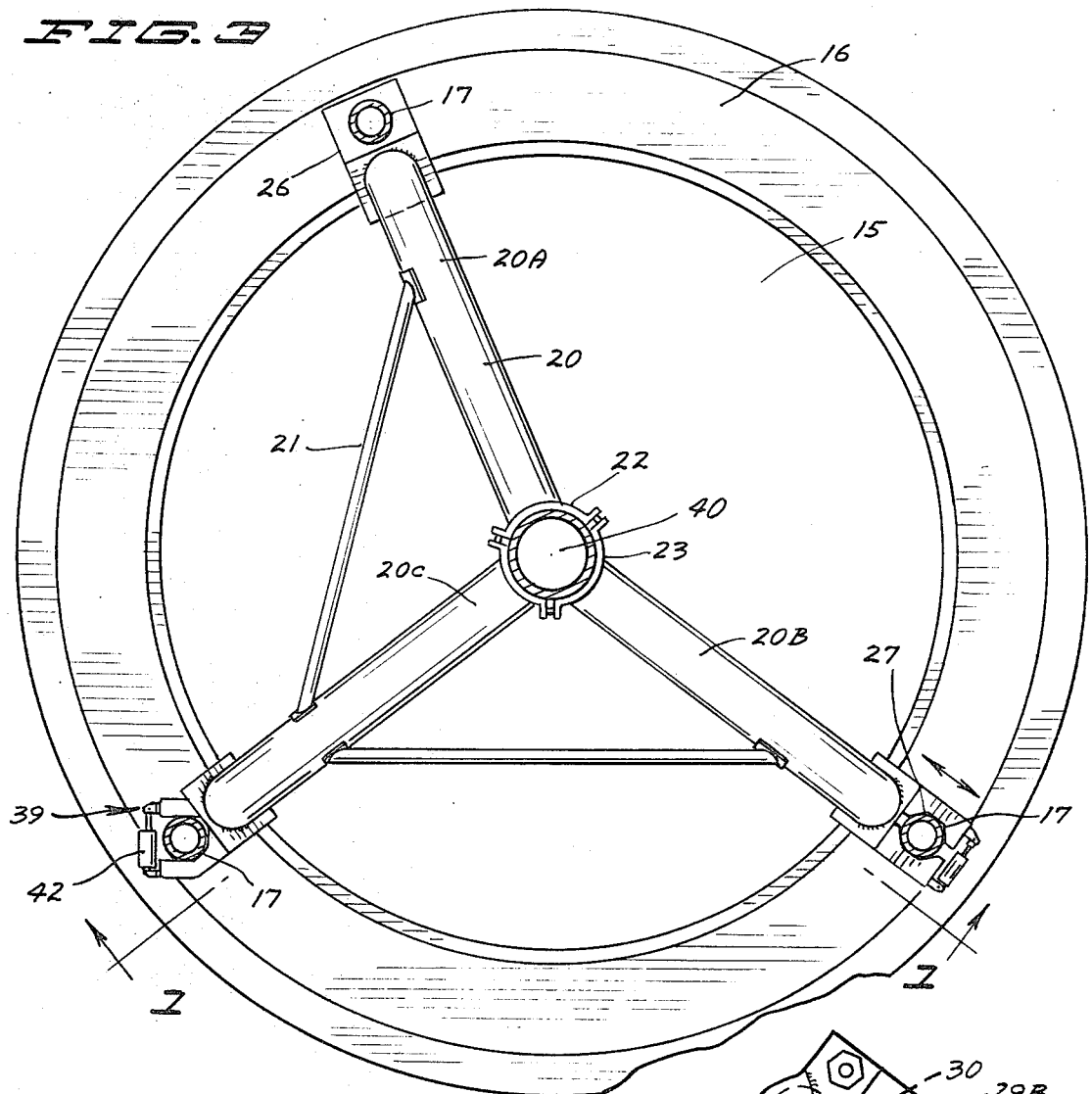
FIG. 3 is a sectional view taken as on line 3—3 in FIG. 1.
Figure 4:
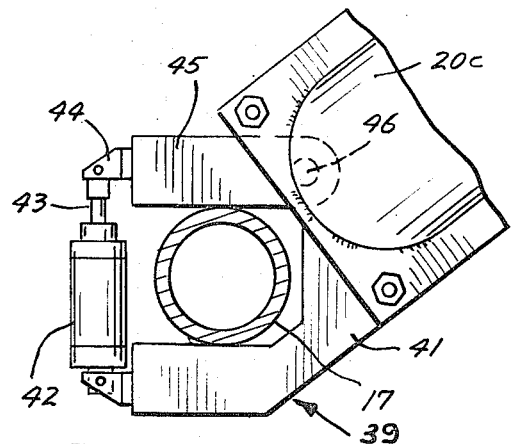
FIG. 4 is a fragmentary enlarged sectional view of a first clamping member used with the mounting device of the present invention.
Figure 5:
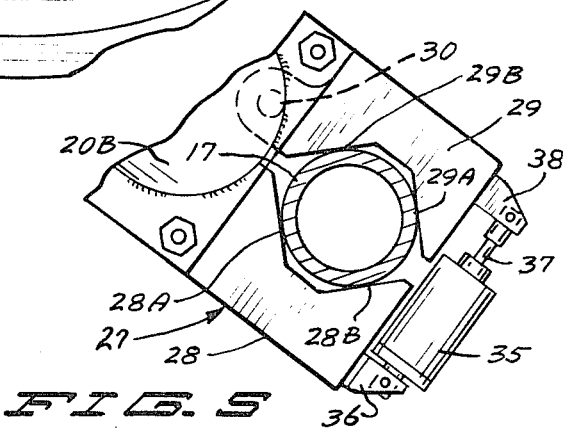
FIG. 5 is a sectional view of a second clamping member used with the device of the present invention.

A nuclear reactor pressure vessel shown typically at 10 is mounted in a very firm foundation 11, and includes walls of metal forming an interior cavity or chamber 15 having a hemospherical bottom, cylindrical side walls 13, and nozzle pipes 14 leading from the vessel chamber 15. The top of the chamber 15 is surrounded with a mounting flange 16 that is closely machined to provide a very accurate mounting surface, and on which the vessel dome or cover is mounted. This dome is not shown, but is a cap that goes over the interior chamber 15 when the reactor vessel is in use.

In the use of reactor vessels, periodic volumetric and visual inspections are specified in Section 11 of the ASME Boiler and Pressure Vessel Code. In the normal situation, the vessel is inspected before it is put into service, and then is subsequently inspected on a periodic basis, so that it can be determined whether or not the vessel is deteriorating in any regard. It is desired of course to know what the condition the vessel is before it is started up, and then compare this condition to its condition at later times. In doing this, ultrasonic inspection using known transducers is sometimes used, and the ultrasonic inspection results may be recorded in a suitable manner for later comparisons. To make the comparison accurate, the position of the inspecting device should be known so that the comparison can be directly made to previous portions of the vessel. Likewise, visual inspection using television cameras and lights can also be carried out and compared to visual inspection results recorded on video tape at the time of the initial startup of the reactor vessel.

Thus, in order to have meaningful inspections, the inspecting device has to be position oriented, to correlate the position with the previous record of inspection results, whether it be ultrasonic, visual, or other inspections.

That means that in order to have the inspection device operate properly it has to be capable of being returned to its initial position, and at some reference point.

When the dome or cover for the pressure vessel is mounted on the flange 16, it is usually mounted in with a plurality of studs that are screwed into the foundation and flange to secure the vessel cap in place. When the cap or dome is removed, three large studs illustrated at 17 are installed into the normal openings for the holding studs. The empty stud openings are capped to keep foreign material out of the threaded area, and once the reactor vessel dome is removed, the long guide studs 17 are used for mounting the inspection equipment.

As shown, a tripod 20 has individual legs that fit over each of the studs 17, as shown in FIG. 3. The threaded openings for the studs which hold the cap or dome of the pressure vessel in place are not shown in FIG. 3, but generaly there are a large number of them spaced around the periphery. The tripod 20 includes a first leg 20A, a second leg 20B and a third leg 20C. Suitable bracing 21 can be positioned between the legs, and as shown, the legs are held together with clamp members 22 around a main mounting tube 23 of a telescoping tube assembly illustrated generally at 24. The telescoping tube assembly as shown is made up of a plurality of concentric tubes which telescope together and can be controlled from a winch assembly 31 to raise and lower the concentric tubes relative to the main tube 23 in a known manner. The tripod 20 is supported on suitable spacer spools 25 which seat against the flange 16, and the spacer spools have enlarged flange members that support the tripod 20. The spacers 25 go around the studs 17, and protect the surface of flange 16, which must be protected in order to prevent damage to the sealing surface for the reactor vessel cap or dome.

The tripod is mounted onto the spacer washers 25 with suitable members. There is a foot member 26 attached to the leg 20A, which has a surface that rests against the washer 25, and an opening which permits the tripod foot to telescope over the corresponding stud 17. The fit of the opening in foot 26 around the stud 17 is quite close, so that the unit is guided properly on the stud 17. It should be noted that the ends of the studs 17 are tapered to permit guiding the tripod and also the reactor vessel cover into place.

In order to properly center the axis of the telescoping tube assembly 24 over the exact longitudinal center axis of the vessel chamber 15, it is necessary to seat the tripod properly. In order to do this, the leg 20B includes a clamp member 27 that includes a fixed jaw member 28 and a pivoting clamp member 29.

The fixed member 28 is mounted to a base that attaches to the end of the leg 20B and rests down against the washer 25 underneath the clamping assembly, and the pivoting member 29 is mounted about a pivot 30 with respect to the base and thus with respect to leg 20B. The movement of the pivoting member 29 is controlled through the use of a pneumatic (fluid pressure actuated) cylinder 35, that is attached at one end to brackets 36 on the fixed member 28, and which has a rod 37 that is actuable with an internal piston with pressure to be moved in and out. The end of rod 37 is attached to a bracket 38 on the movable member 29.

It should be noted that the members 28 and 29 are formed with clamping jaw surfaces 28A, 28B, 29A, and 29B. The surfaces are positioned at 90° to each other, so that the particular stud 17 on which this clamp member 27 is mounted is engaged only along four tangent lines at 90° to each other. Thus when the cylinder 35 is actuated the movable member 29 will clamp the stud 17 against the jaw surfaces to positively center clamp member 27 on this particular stud 17. Any play in the opening in the foot 26 will be taken up and the clamp 27 will be centered very accurately on the stud 17. This will position the center axis of clamp member 22, which is indicated at 40, with respect to two of the studs 17 quite accurately.

In order to obtain ultimate accuracy of positioning of the axis 40, a clamp member 39 is mounted onto the end of the tripod leg 20C, and includes a fixed member 41 that is attached to a flange on the end of the leg 20C, and has an outwardly extending jaw portion on which a cylinder 42 is mounted. The cylinder 42 has an actuable rod 43 that extends to a bracket 44 on a pivoting clamp member 45. The clamp member 45 is pivotally mounted with a pin 46 to the end of the tripod leg 20C. The axis of the cylinder 42 is positioned so that it is substantially 90° to the line drawn between the axis of the two studs 17 on which the clamp 27 and the clamp 39 are mounted. Then the clamping force when the cylinder 42 is retracted or actuated, will pull the clamp member 45 against the stud 17 to which it is mounted, and will also then pull the jaw portion of the fixed member 41 against the stud to positively center and pull the unit into position. This gives maximum force to pull the tripod unit into position. Note that the clamp 39 engages the stud 17 on only two lines, with surfaces parallel to each other and to the line between the center of the studs for clamps 27 and 39.

The telescoping tube assembly illustrated generally at 24 includes the main mounting tube 23, and the telescoping sections 24A, 24B, 24C, and 24D. The telscoping tube sections are guided with suitable rollers (which are not shown) and are of the usual design used with manipulators for raising and lowering the manipulators normally for carriages. The telescoping tubes can be cable controlled as will be shown schematically in FIG. 7, so that they are controlled in movement in both directions. The tubes are raised and lowered through the use of a cable control attached to the innermost tube 24D extending up through the center of the tube assembly to a winch assembly 31.

Winch assembly 31, as shown in FIG. 1, is mounted at the top of an extension tube 48 that is bolted to a suitable flange on the tube 23, to locate the winch assembly above the level of pool water 49 that is used in the reactor pool to keep the device cool during servicing and the like. The extension tube 48 can be removed, and then the winch assembly 31 is mounted right on the main mounting tube 23, as shown in FIG. 2, this Figure also showing the telescoping tubes fully retracted.

At the lower end of the inner mounting tube 24D, there is a clamp 50 that mounts a cross tube or boom assembly 51 (see FIG. 6). This clamp 50 is mounted on the lower end of tube 24D so that it may be rotated relative to the tube about the upright axis of the telescoping tube assembly 24. The mounting of clamp 50 includes a mount 55 fixedly secured to tube 24D, mount 55 in turn rotatably mounting a ring gear 54 that is secured to clamp 50 for rotating the clamp. The ring gear is driven by a spur gear on a motor 52 that is inside an outer housing which may be pressurized, motor 52 being mounted on mount 55. In addition, there is a rotational position encoder 53 mounted on mount 55 to engage the ring gear 54 and be driven by the ring gear.

The encoder 53 is a rotary device that delivers an electrical signal proportional to the rotation of its input shaft which carries a gear that is driven by ring gear 54.

The encoders are conventional units for delivering these signals, and a typical one will be more fully explained later.

As shown in FIGS. 1 and 6, the boom assembly 51 is mounted in the clamp 50. The construction of boom assembly 51 is perhaps best shown in FIG. 7. The boom assembly 51 includes an outer boom tube 58 which is fixed in the clamp 50, at a desired location along its periphery. The boom tube 58 can be positioned so that when inspection equipment is mounted on it, the equipment will counterbalance on opposite sides of the clamp 50.

The outer boom tube 58 has guide rollers 59 thereon for guiding an intermediate boom tube 60 so that the intermediate boom tube 60 can move in and out (telescope) with respect to the outer boom tube 58. The outer boom 58 has an end plate 61 closing one end thereof, opposite from the opening through which the intermediate boom tube 60 will extend. An inner boom tube 62 is mounted inside the intermediate tube 60 on suitable rollers 63 rotatably mounted in the wall of the intermediate boom tube 60 whereby the inner tube 62 telescopes inside the intermediate tube. The intermediate boom 60 also has an end plate 64 closing the inner end thereof.

A double acting fluid pressure actuated cylinder-piston assembly is mounted on the interior of the inner boom tube 62, and the cylinder 65 thereof is clamped or attached to the end plate 64 of the intermediate tube 60. An actuator rod 66 of the cylinder 65 extends through an opening in the end plate 64 and is fixed to the end plate 61 of the outer boom tube 58. The double acting cylinder assembly 65 can be actuated to extend the rod 66. This causes the outer cylinder 65 to slide along the rod and move the end plate 64 and the intermediate boom tube 60 in direction that is indicated by the arrow 67 relative to the outer tube 58. At the same time, the inner boom tube 62 is made so that it will move relative to the intermediate boom 60 through the use of a cable sheave assembly which is shown only schematically.

For example, a cable 71 is dead ended as at 72, to the inner surface of the outer boom tube 58, and it passes over a roller or sheave schematically shown at 73, that is rotatably mounted on the wall of the intermediate boom 60. The schematic showing is because the cable 71 and the sheave 73 have to clear the guide rollers 59, so they are rotated from the position shown to avoid interference with the guide rollers. The cable 71 extends over the sheave 73 through a provided opening in the wall of the tube 60 and passes between the inner surface of the intermediate tube 60 and the outer surface of the inner tube 62. The cable 71 is attached as at 74 to the outer surface of the inner tube 62. A second cable 75 is also attached as at 74 to the inner tube 62 and extends over a sheave shown schematically at 76, through a provided opening in the intermediate tube 60, and then passes toward the open end of the tube 58 between the inner surface of the outer tube 58 and the outer surface of the intermediate tube 60. The cable 75 is then deadended or attached to the inner surface of the tube 58 as at 72 as well. This means that the inner tube 62, which is slidably mounted with respect to the intermediate tube 60 will be moved relative to the intermediate tube when the cylinder 65 is actuated to extend the intermediate tube. In FIG. 6, the boom 51 is partially extended.

The inner tube 62 has an end mounting plate 77 attached thereto on which suitable inspection or detection equipment can be attached, for example, as shown in FIG. 8. When the cylinder 65 is retracted and moves in opposite direction from the arrow 67, the tube 60 will be pulled back inwardly so that the end plate 64 moves toward the end plate 61, and when this occurs, the cable 75 will act on the inner tube 62 to move it inwardly to its position as shown in FIG. 7 as the intermediate tube is retracted.

As shown in FIG. 6, the outer tube 58 can be positioned so that an outwardly extending end thereof has a mounting bracket 80 mounted thereon, and a manipulator arm assembly illustrated generally at 81 can be mounted on this mounting bracket. The manipulator arm assembly is a standard powered manipulator, sold for example the type sold by Programmed & Remote Systems Corporation, their model 3000. Also, a general showing of a manipulator of the type used is made in U.S. Pat. No. 3,247,978.

As generally explained in the aforementioned U.S. Pat. No. 3,247,978, the manipulator assembly 81 has a shoulder member 82 that is continuously rotatable with respect to its mounting member 83, which in this instance is attached to the bracket 80. In addition, there is an upper arm member 84 that is pivotably mounted with respect to the shoulder member 82 for movement about a transverse pivot; a forearm member 85 which is pivotally mounted to the upper arm member 84, and a wrist or hand actuator member 86 that is in turn pivotally mounted to the forearm member 85. This manipulator is shown in FIG. 1 and other figures of the drawings.

The hand member 86 incudes gripping jaws 87 that can be used for grasping tools and the like, and can also be of the type shown in the aforementioned U.S. Pat. No. 3,247,987. Also, the hand can be replaced with a suitable tool or inspection fixture if desired.

Thus the gear 54 driven from the motor 52 rotatably drives the clamp 50 and the entire boom assembly 51 about an upright axis. The actuation of the cylinder 65 permits the extension of the boom tubes as necessary or desired. The manipulator assembly 81 can be actuated about several axes to get into any difficult area in the nuclear reactor chamber, in order to conduct any desired inspections and to adjust inspection equipment or lights.

Referring now specifically to FIGS. 9 and 10, the construction of a winch assembly 31, which is utilized for raising and lowering the telescoping tubes as shown. Innermost telescoping tube 24D is moved with a pair of cables, to provide redundancy of control for safety. As shown in FIG. 9, there are a pair of sheaves 90 and 91 which are mounted to the innermost tube 24D. The sheaves each have a separate cable mounted thereover, and the separate cables are controlled by separate winch drums so that there is redundancy in the winch drive.

For example, a first cable 92 is mounted onto a winch drum 93, and extends downwardly to go over the sheave 90, for example. This cable 92 then passes back upwardly, and as shown in FIG. 10 is attached to a rod 94 that is slidably mounted in a housing 95. The rod has a head 96 attached thereto extending on the opposite side of the housing. A spring 97 in the housing 95 abuts against the head 96. The head 96 is positioned, when the spring has urged it to its solid line position of FIG.

10, to engage a switch 98, which controls power to the drive motor for the winch, and also controls actuation of a brake on the drum. However, when the cable 92 is under load the spring 97 is collapsed, and enlarged flange of the head 96 is down against the top of the housing 95 as shown in dotted lines in FIG. 10. This is the normal position for the head member 96. The first winch drum 93 is rotatably mounted on a shaft 102 that in turn is rotatably mounted in a frame 103 that is used for supporting the winch assembly 31. The frame 103 of course is mounted to the top of the extension tube or to the top of the main tube depending on the configuration of the unit.

The drums of the winch are driven from a motor 104 that is suitably mounted in a bracket. The motor through a non-reversible worm gear drive and the output shaft drives a small bevel gear 105 that in turn engages a large bevel gear 106. The large bevel gear 106 is pinned on the shaft 102 so that it drives the shaft and also is prevented from axial movement in direction away from the drum. The gear 106 drives through a floating pin to the end hub of the drum 93. The drive pin 107 is carried by a washer and floates on the shaft 102 so that when the force from the gear 106 is in a first direction of rotation, the pin is acted upon between ramps to urge the drum 93 toward the opposite end of shaft 102. At the opposite end of the drum 93 from pin 107 there is a gear 110 which is drivably mounted to the end plate of the drum plate 93 so that the gear and the drum move together. In addition, against the outer face of the gear, there is a first friction disc 111 comprising a brake disc, a ratchet or toothed wheel 112, a second friction disc 111, and a hub 113 that is fixed with a pin to the shaft 102. The drum 93 is thus sandwiched between the hub 113 and gear 106. The drive goes from gear 106 through pin 107 to the drum for driving the winch, and also through the shaft to hub 113 and then the friction discs to the drum.

The toothed wheel 112 is aligned with a ratchet dog 115 so that the wheel 112 can only move in one direction, namely the direction indicated by arrow 116. The spur gear 110 engages a second spur gear 117 that in turn is drivably mounted onto one end flange of a second winch drum 118. The second winch drum has a second cable 119 mounted thereon. The cable 119 extends downwardly around the sheave 91, and it also extends back upwardly and deadends on a rod 94A slidably mounted in a housing 95A. The housing 95A is fixed to the frame 103, just as the housing 95 is fixed to the frame. The rod 94A has a head member 96A that controls a switch 98A in the same manner as the head 96. In normal position, the head member 96A would be down against the top of the housing 95A with the cable 119 supporting load from the telescoping tube assembly 24. The housing 95A also includes a spring just the same as spring 97.

The drum 118 and the gear 117 are both drivably mounted on a shaft 120 that in turn is rotatably mounted in opposite end walls of the frame 103, and extends parallel to the shaft 102. In addition, the bevel gear 121 is drivably mounted on the shaft 120, and drives a small bevel gear 122 that is attached to an electric brake assembly 123. The electric brake in turn is mounted onto the frame 103.

A rotary limit switch 126 is mounted onto the frame 103, and has a gear 127 attached to its output shaft that engages the gear 117. The rotation of the drums will cause the rotary limit switch 126 to rotate, and the switch also is in series with switches 98 and 98A to shut off the motor 104 when the travel of the cable is exceeded. This acts as a safety feature to prevent the cable from being extended too far.

The winch is a fail safe unit so that if one cable should break, the slack cable switch 98 or 98A, depending on the cable would immediately be contacted by the spring loaded head member 96 or 96A, and this would activate the brake 123 and shut off the motor 104 at the same time. The brake 123 acts through the gears 122 and 121, and gears 110, 117 to stop both drums.

A fail safe brake is the ratchet wheel 112 acting with the ratchet dog 115. If the winch unit should start to drop, (for example, if gear 105 broke) the drums run in reverse. The pin 107 is made to run up ramp surfaces formed on the ends of the hub for gear 106 and the adjacent end flange of the winch drum. This forces the drum toward wheel 112 to put pressure on the drum, and friction discs 111 to hold the wheel 112 tightly between the friction discs (hub 113 provides the backing for this force). The dog 115 prevents the ratchet wheel 112 from rotating at all. This stops both drums because of the gear connection through gears 110 and 117. The ramp surfaces acting through the drive pin 107 causes the tightening of the friction discs 111 against the ratchet wheel 112, and it should be noted that when the unit is driven in lowering direction, (to extend the cables) the ratchet wheel 112 is also held and is not driven. However, the pin 107 will be seated in a pocket so there is no end load on the friction discs 111 which will permit the ratchet wheel to merely slip. The load from the tubes actually drives the winch drum and motor 104 follows as the unit rotates. The dog 115 will hold the ratchet wheel. If there is any reverse load on the winch drums tending to rotate the drums in lowering direction, and the motor 104 is not running, the pin 107 will again ramp up between gear 106 and drum 93 and will cause an end load against the friction discs 111 to lock the brake so wheel 112 will hold the winch.

In order to monitor the movement of the telescoping tubes in vertical direction, an electrical encoder illustrated generally at 130 is utilized. The encoder is driven by a cable 131, that wraps around a drum 132 which is spring loaded in an up direction through a spring motor (not shown but it will be discussed typically in connection with another encoder). The rotation of the drum 132 drives a set of gears illustrated at 133. The small gear is on the output shaft of an electrical encoder that delivers an electrical signal as it rotates to indicate the amount of extension of the cable 131 and thus the vertical position of the telescoping tube assembly 24 along the walls of the vessel chamber 15. In this manner the encoder signal can be used for purposes of positioning any inspection equipment properly.

Figure 11:
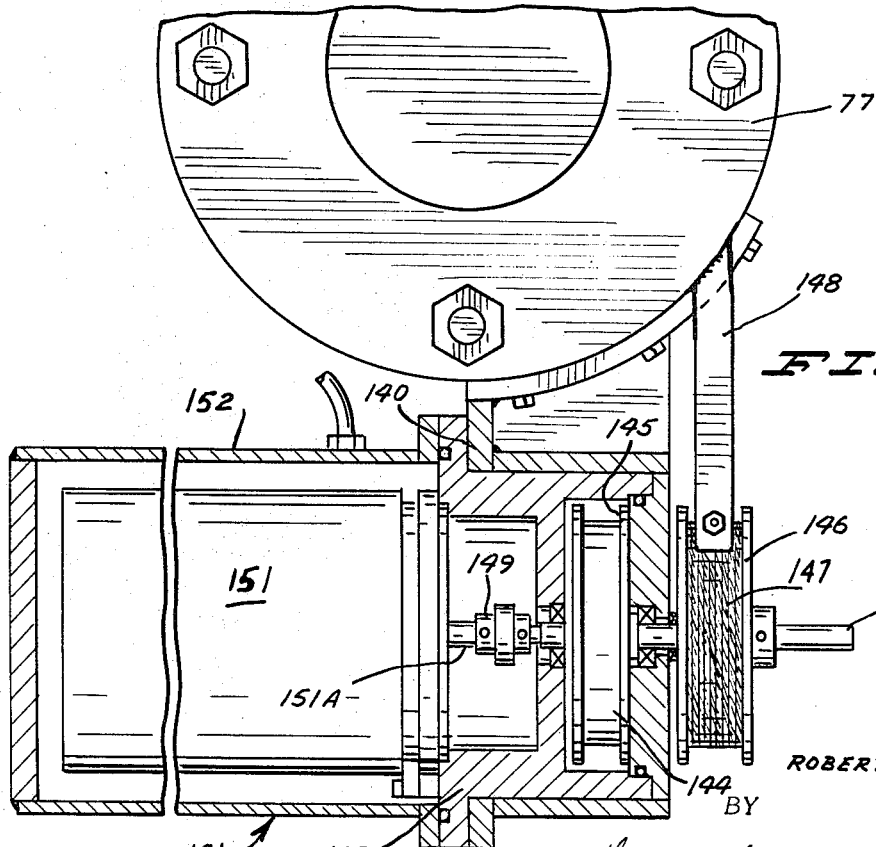
FIG. 11 is a vertical sectional view taken as on line 11—11 of FIG. 6 showing a typical position coding assembly for signaling the position of moving components.

Referring now specifically to FIG. 11, a typical electrical position encoder assembly is shown. The encoder shown in FIG. 11 is the encoder specifically used in combination with the horizontal boom assembly 51, but the unit is used in this typical form in all of the positions that are monitored.

Also as shown is the housing that is pressurized and is used with all of the encoder assemblies that are submerged to keep water out of electrical parts.

A bracket 140 mounts the encoder assembly to the outer tube 58, (note that the end plate 77 on tube 62 is also shown in FIG. 11) and this bracket in turn holds the encoder assembly 141. The encoder assembly includes a mounting frame member 142 that rotatably houses a shaft 143. A spring motor 144 is mounted onto a reel 145 that in turn is drivably mounted on the shaft. The spring motor comprises a flat spring wound around a reel, with one end anchored to the housing 142, and the other attached to the reel. The outwardly extending portion of the shaft 143 has a cable reel 146 drivably mounted thereon, and the reel 146 has a cable 147 wound therearound. The cable 147 in turn is anchored to a bracket 148 that is attached to the end plate 77 of tube 62.

A coupling member 149 drivably couples the shaft 143 to the input shaft 151A of an electrical encoder 151. The encoder is an electrical signal generator that gives an output signal proportional to the number of revolutions that the shaft 151A makes. The encoder 151 is a commercially available unit manufactured by Theta Instrument Corporation, Fairfield, New Jersey and their model number TR-513-C has been found to be satisfactory. The spring motor utilized has been made by Aeromotove, their kit Number 52204-2.

Any rotation of the encoder shaft gives the output electrical signal. The encoder assembly shown in FIG. 11 is typical of the encoders utilized, and the shaft 151A for each of the encoders is driven in a suitable manner at a suitable rate. For example, in the encoder assembly for the winch assembly 31 for lifting the tubes, the shaft 151A for the encoder itself is driven through gear sets, to get the proper output signal. A similar spring motor for drum 132 is used on the reel for mounting the cable 131.

The encoder assembly as shown in FIG. 11, has a housing 152 mounted thereover, and the housing surrounds the encoder 151 itself, and as will be explained, is pressurized so that water surrounding or filling the reactor vessel will not damage the interior parts of the encoder or cause a shorting out of the electrical signals generated.

In order to pressurize the components, and to prevent water from entering critical or electrical components, such as the encoder 151 a mechanism has been devised to carry air pressure in the housing over the critical submerged components. The components are placed in the housings and air pressure is carried in the interior chamber of the housings to keep water away from the electrical parts or other parts which may be affected by water. The manipulator arms 84 and 85, as well as the shoulder assembly 82 are all pressurized, as is the housing over the motor 52, the housing over the encode assembly 53, (boom rotate encoder) is pressurized and also the housing over encoder assembly 141.

Figure 12:
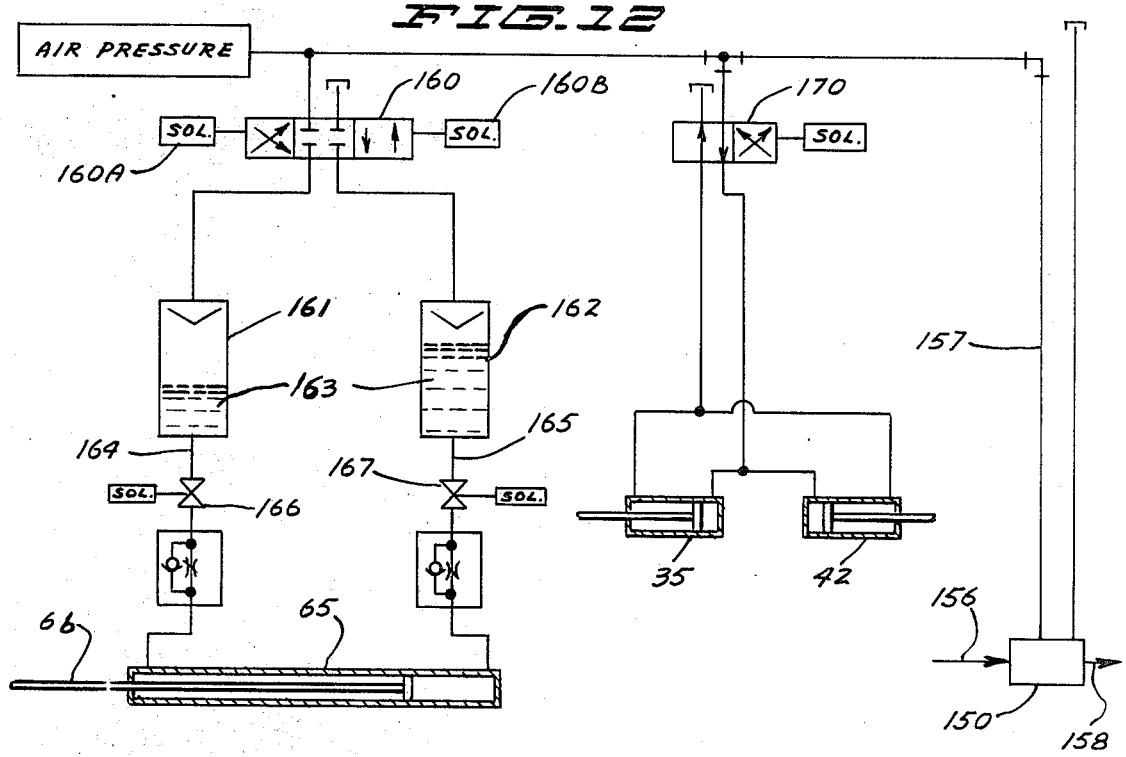
FIG. 12 is a schematic representation of the control system for the cross tube mounting and clamp members of the present invention.

The pressure in the housings over the components is maintained at a desired level by utilizing a biasing relay regulator illustrated generally at 150. The regulator is mounted, as shown, adjacent the lowermost portions of the unit (subjected to pressures from the water similar to the deepest components) and as shown is mounted on the clamp 50. This biasing pressure regulator relay is also shown in FIG. 12 schematically. The relay is a unit made by Fairchild Hiller, Industrial Products Division, Winston Salem, N.C., their model 15, which is called a spring biased volume booster relay. The relay is normally used for regulating an output pressure in relation to a separate signal pressure. In this particular instance, the signal pressure port is left open, and senses the water pressure, which varies of course according to the depth of the unit below the level of the pool surrounding the reactor. The input signal port is indicated at 156, and the input line for fluid under pressure from the pressure source is indicated at 157. A pressure in an output line 158 is regulated or maintained at a pressure that can be any desired differential over the input pressure at the signal input port 156. For example, the pressure at the output line 158 can be maintained at 1 lb. per square inch above the pressure at the signal input port 156. An exhaust line shown in FIG. 12 is provided for exhausting the air from the pressure source when necessary. This regulator is an available unit, but the mounting for use in varying depths of water to differentially pressurize components is unique.

The output line 158 is then connected to each of the housings or components to be pressurized, as shown schematically, the manipulator, the motor housing 52, the encoder housing 53, and the encoder housing 152. Other components do not have to be pressurized as they will operate even in water environment.

This means that the seals on the manipulator arms 84 (the manipulator arms are hollow frame members as shown in U.S. Pat. No. 3,247,978), have to be maintained at only about one lb. per square inch greater than the water pressure. This means that there will be less bubbling of air because there will be less likelihood of leakage out past the seals.

Thus the concept of having a following pressure regulator relay which permits the pressurization of components held under water at a variable pressure keyed to and sensed from the water pressure itself is a portion of the invention. When the components are in shallow water the pressure inside the pressurized housings is less than when the unit is in deeper water. The differentiation is what is maintained.

The cylinder 65 used for powering the boom extending tubes also is operated with pressure over water. The cylinder 65 is actually filled with water to prevent contamination of the surrounding reactor pool which may result because of leakage from hydraulic oil, and further the use of liquid rather than a straight air or pneumatic system makes the cylinder 65 solid so that there isn't any cushioning or compression effects as would be present in the pneumatic cylinder. This makes the positioning of the boom assembly 51 positive as well.

As shown in FIG. 12, the cylinder 65 and the rod 66 are controlled from a four way, solenoid operated pneumatic valve assembly 160 which regulates the flow of air under pressure from a source, which can be any type of compressor desired, to one of the other of a pair of accumulators. There is a first accumulator 161, and a second accumulator 162. The accumulators each are partially filled with water indicated at 163, and have an air pocket above the water, as is normal. In addition, the output lines 164 and 165, respectfully have solenoid valves 166 and 167 in them. Solenoid valves 167 are normally closed solenoid valves and are energized to open when either one of the solenoids 160A and 160B are energized to actuate the valve 160. The output lines from the solenoid valves 166 and 167 each pass through a separate flow restriction check valve arrangement which are for controlling the rate of operation for cylinder 65. The lines then open into respective ends of the cylinder 65 on opposite sides of the piston attached to the rod 66.

When the piston rod 66 is to be extended, to extend the boom assembly, the solenoid 160B is energized to move the valve to position wherein air under pressure will enter the top part of the accumulator 162. At the same time solenoids 166 and 167 are opened so that water can pass through both valves. The air pressure acting on the water 163 in the accumulator 162 will force the water into the base end of the cylinder 65 moving the rod correspondingly, and the water in the rod end of the cylinder 65 will in turn return into the accumulator 161. Air in the accumulator 161 will be passed through the valve 160 to the exhaust side. Valve operation to move the rod 66 oppositely is also exactly opposite, with the solenoid 160A being energized, air under pressure acting on the water 163 in accumulator 61, and then the air in accumulator 162 being exhausted through the valve as the piston is moved toward the base end of the cylinder 65.

A valve 160 is shown in FIG. 12 for controlling the guide stud clamp cylinders 35 and 42 which are shown schematically. It can be seen that the cylinders 35 and 42 are connected in parallel. The valve 170 is energized whenever the clamps are in place so that the tripod unit is held securely under the pneumatic air pressure of the pressure source to positively clamp the studs 17 between these clamp members.

Referring to FIG. 8, there is a side view showing of a modified form of the inspection device. The tube 58 of the boom assembly 51 has been reversed in the clamp 50 from that shown in FIG. 6. The manipulator 81 has been mounted on an outwardly extending portion of the tube 58, which is on the opposite side of the clamp from the showing of FIG. 6.

Also, there is a member 171 clamped to the tube 58, that mounts a television camera 172, which is only shown schematically. The pictures from the camera of course can be viewed on a screen by an operator or inspector, and the inspection can be video taped. Lights such as those shown in 173 can be mounted on suitable brackets 175 for illuminating the side walls of the reactor vessel, and the mounting member 77 on the inner tube 62 of the boom assembly can be used to mount an ultrasonic testing device illustrated schematically at 174. The manipulator 81 can be operated to position the lights of camera, and can replace lights and the like, can pick up foreign materials, and can perform other duties. The ultrasonic detector 174 can prepare an ultrasonic readout to the device which can be recorded. As shown the encoder 141 to determine the boom extension is also connected, as is the rotation sensing encoder, and of course the vertical position encoder also is positioned to give a precise indication of the position of the inspection unit.

Figure 13:
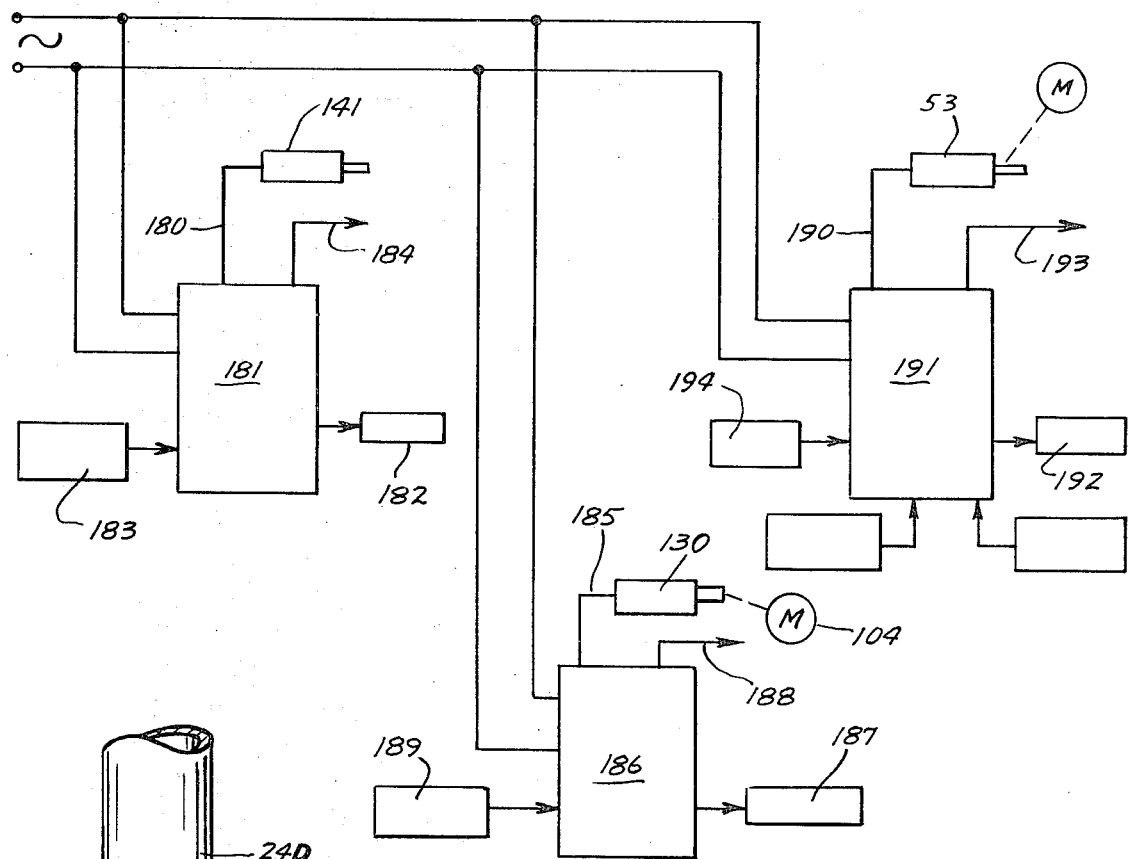
FIG. 13 is a simplified schematic representation of the electrical circuit for the coding system for determining position during inspection.

Here, referring now to FIG. 13 the encoders and readout circuitry are shown schematically. The boom extend position encoder 141 delivers an electrical signal that is fed through a line 180 into circuitry indicated at 181 that provides a readout signal at 182. A zeroing set 183 can be provided so that when the boom is all the way retracted against a known stop, or at some other known position, the readout can be set to zero, and then any axial movement of the boom 51 will give a readout determining the number of inches or feet of travel of the boom. A separate output line 184 for other control circuits also may be provided.

The hoist position encoder is driven by movement of the hoist tubes which are controlled by the hoist motor 104, and this encoder 130 has an input line 185 that delivers an electrical signal to a separate circuit illustrated by box 186, which will provide a readout signal 187, or which will provide a desired control signal on line 188. A zeroing circuit 189 can be used for zeroing the readout of the instrumentation circuitry 186 when the hoist is at a known position. This can be at its base or retracted position, or it can be at some known line along the wall of the reactor pressure vessel. For example, a particular spot can be marked in a known manner in the reactor wall and the detector, for example the ultrasonic detector 174, can be positioned at this spot. Then the hoist encoder circuitry can be set to zero and any movement in either direction from this point will be indicated on the readout circuitry 187 or on the output signal line 188.

The boom rotate position encoder 53 sends an electrical signal along the line 190 to circuitry 191 that has a readout screen member 192, or a separate signal output readout line 193. The output lines permit use of signals for computer drive, for example, to control recording of the ultrasonic inspection, or to a computer control for a video tape recorder to record a television inspection of the reactor pressure vessel. Again, zeroing circuits 194 are provided so that when the boom is rotated to a known position the circuitry can be zeroed, and any movement of the boom will activate the encoder 53 to deliver a signal, and through the suitable electronic circuitry deliver a readout on 192, or a control signal on 193 to other devices that are to be used.

The circuitry is shown only schematically, and is commercially available from Theta Instrument Corporation as a comparison control for the encoders. The circuitry has many options for control and this circuitry is generally described in their bulletin 67-10 for circuits sold under their Trademark DECITRAK. The control can be keyed to any desired program, and the three encoders will permit exact positioning of the inspection devices or sensors for doing the testing, or for the television camera, for scanning. The exact position of the unit will always be known, because its vertical height along the axis of the reactor is known by the hoist position encoder, the rotational position is known from the boom rotate encoder and the boom extend for the extending member is also known.

Thus a repeatable program can be stored on magnetic tape or with other information storage devices so that the results of testing the unit at one time can be compared to that at a later time.

Figure 14:
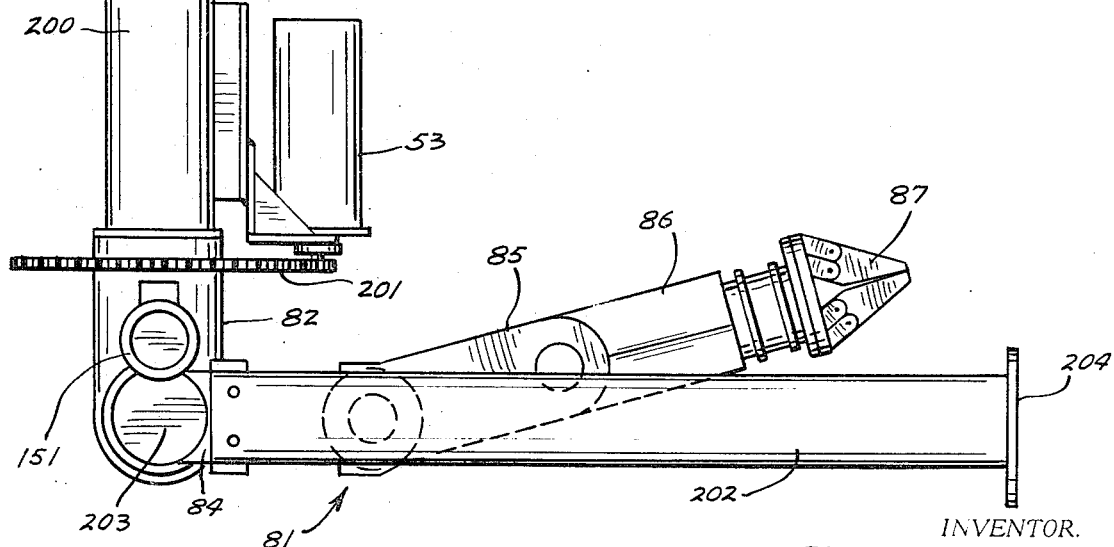
FIG. 14 is a fragmentary side view of a modified mounting of a device of the present invention used for inspecting vessels.

Referring now to FIG. 14, a modified form of the device as shown. The inner tube 24D is now coupled into an adapter member 200 that is used to mount the shoulder housing 82 of the manipulator assembly 81. The manipulator assembly has a standard rotate drive about an upright axis, which is now aligned with the axis of the tube 24D, and therefore the power drive for rotation is the conventional manipulator rotate drive. The shoulder rotate also drives the encoder assembly 53 driven through a ring gear 201 that is drivably mounted onto the rotating portion of the manipulator shoulder and drives a gear on the encoder shaft.

The upper arm member 84 of the manipulator is hidden behind a U shaped frame work 202 that is mounted to move with the upper arm member of the manipulator. The upper arm member 84 is pivotable about the upper arm axis of the manipulator, and the encoder 141, which was the boom extend encoder, can now be gear driven to a suitable gear mounted on the upper arm 84 of the manipulator. The U shaped frame 202 will rotate about the horizontal axis indicated at 203 which is the upper arm mounting axis so that the frame can move in a semicircle around the axis 203. The frame 202 has an outer end plate 204 that can mount inspection equipment, and in this manner, the manipulator itself can be used for inspecting semicircular areas such as the bottom of the reactor vessel if desired. The manipulator also can be operated in the normal manner to hold lights or other devices if desired. In this particular instance, there are also three encoders, one to monitor the rotation about the vertical axis of the tubes 24D, the regular encoder for the hoist position, which determines the unit's position along the vertical axis, and the encoder 151 which determines the position of the frame work 202 about the axis 203. Therefore any mounting or inspection equipment mounted at the plate 204 will be precisely positioned and if the inspection equipment moves from a reference position it will have suitable readouts. The manipulator and the encoders in this form of the invention will be pressurized using the biasing relay previously described.

I claim:

1. An assembly for inspecting a vessel having a reference axis, including mounting means, means to position said mounting means in a known relation to the reference axis of said vessel, a first movable support means mounted on said mounting means for movement in direction along the reference axis of the vessel, said first movable support means having a first end movable relative to the vessel, means to control said first movable support means for movement of said first end in direction along said axis, a second movable support means rotatably mounted to the first end of said first movable support means for rotational movement about said reference axis, said second movable support means being extendable and retractable in direction transverse to said reference axis, said second movable support means including means to mount vessel inspecting equipment thereon, sand position detection and indicating means providing signals indicating the position of the first end of said first movable support means along the reference axis with respect to a reference point, and for indicating the position of said second movable support means with respect to its rotational position about said reference axis.

2. The assembly as specified in claim 1 and manipulator arm means mounted on said second movable support means, and said manipulator arm means being actuable to adjust vessel inspection equipment mounted on said second movable support means.

3. A support assembly for an inspection device for a wall of a vessel or the like having a reference axis, said vessel being flooded with a liquid, said support assembly including mounting means, means to position said mounting means in a known relation to the reference axis of said vessel, a first support means mounted on said mounting means, means to control said support means for movement in direction along said axis, a second support means mounted to said first support means at substantially right angles to the reference axis, an inspection device mounted on said second support means, and position detection and indicating means for indicating the position of said first support means with respect to a preselected location along the reference axis of said vessel, and said second support means with respect to its position about said reference axis, and means to pressurize at least some components of the support assembly and inspection device to maintain said some components at a greater pressure than the liquid in which the components are operating, said means including a pressure regulator responsive to an input signal pressure, said regulator being mounted adjacent said second support means to sense the pressure of the liquid at said second support means, and to control said pressure in said some components at a preset relation to the sensed liquid pressure.

4. A support assembly for an inspection device for conducting inspection and tests on a wall of a chamber having a central axis, said support assembly including mounting means, means to position said mounting means in a known relation to the central axis of said chamber, a first telescoping tube means mounted on said mounting means, winch means on said mounting means to control said telescoping tube means for movement in direction along said axis, said winch means including a pair of winch drums, a separate lift cable mounted on each drum, means connecting each of said cables to said first telescoping tube means, separate brake means effective to control each of said drums to provide redundant braking for each drum, a second member rotatably mounted to said first telescoping tube means, means to rotate said second member with respect to the axis of said chamber, means to mount an inspection device on said second member, and position detection and indicating means for indicating the position of said first telescoping tube means along the axis of chamber with respect to a reference point, and to indicate the angular position of said second member about said axis with respect to a reference position.

5. The inspection device as specified in claim 4 and means to actuate at least one of said redundant brake means whenever either of said cables has a preselected amount of slack.

6. The combination as specified in claim 4 a pair of winch gear means drivably connecting said winch drums together, and motor means driving a first of said drums, and through said gear means to a second of said drums.

7. The combination as specified in claim 6 wherein one of said separate brake means is an electric brake, and spring mounted sensing means separately anchoring first ends of each of said cables, respectively, opposite ends of said cables being attached to the respective drums, and separate switch means controlled by each of said sensing means, said sensing means actuating said switch means when the respective cable becomes slack to deenergize the drive motor for said winch drums and to actuate said one brake means.

8. A support assembly for an inspection device for conducting inspections of a chamber wall wherein the support assembly is removed between inspections, said chamber having a central axis, a first support member, means mounting said first support member accurately with respect to said central axis for movement in direction along said axis, said means mounting said first support member comprising a tripod, a plurality of stud means attached to said chamber wall adjacent the periphery of said chamber and extending substantially parallel to the central chamber axis, said tripod member including first, second and third legs, said first leg having means slidably fitting over a first of said stud means, said second leg having a first clamp assembly thereon, said first clamp assembly having jaw members, means mounting said jaw members in position to center the clamp assembly with respect to the axis of the stud means to which said first clamp assembly is attached, when the first clamp member is clamped, and said third leg having a second clamp assembly thereon, said second clamp assembly including means actuable to exert clamping force in a direction substantially perpendicular to a line between the central axes of the stud means on which said first and second clamp assemblies are mounted to center the support member with respect to the stud means, means to mount an inspection device to said first support member, and position detector and indicating means to indicate the position of said first support member and an inspection device mounted thereon relative to a reference point along said central axis.

9. A support assembly for an inspection device for a wall of a chamber such as nuclear reactor pressure vessel having a key longitudinal axis and being substantially cylindrical, comprising mounting means, a plurality of telescoping tubes mounted on said mounting means, said mounting means including means to position the longitudinal axis of the telescoping tubes substantially coinciding with the key axis of said chamber, power means to move said telescoping tubes in direction along the key longitudinal axis of said chamber, in a first path of movement, first electrical signal means to indicate the position of the telescoping tubes along said key axis with respect to a preselected position, a support member, means to rotatably mount said support member to one of the telescoping tubes for movement about the longitudinal axis of said telescoping tubes in a second path of movement, second electrical signal means to indicate the position of said support member about the axis of said telescoping tubes with respect to a reference point, and means to mount an inspection device to said support member for movement with respect to the telescoping tubes in a third path of movement different from said first and second paths of movement, and third electrical signal means to indicate movement of said means to mount said inspection device in said third path with respect to a reference point, said first, second and third electrical signal means providing independent signals which indicate the position of an inspection device mounted on said support with respect to the wall of the chamber in the three paths of movement.

10. The combination as specified in claim 9 wherein said chamber is flooded with a liquid, and said second telescoping tube assembly comprises at least two nesting tubes, a fluid pressure actuated cylinder for operating said tubes to telescope relative to one other, said cylinder having an outer housing connected to one of said tubes, and a rod member connected to an other of said tubes, and said cylinder being filled and actuated with a liquid compatible with the liquid filling of said chamber, said cylinder having a pair of lines for control fluid, accumulator means in each of the lines for said cylinder, the output sides of said accumulators having said compatible liquid therein, a source of pneumatic pressure and control valve means for relatively pressurizing the input sides of said accumulators on input sides thereof with said pressure from said pneumatic source to in turn actuate said cylinder in the direction of lesser pressure.

11. The combination as specified in claim 10 and second valve means in each line to said cylinder for selectively closing off the fluid flow between the output sides of said accumulator means and said cylinder, said second valve means being normally biased closed, and means to open said second valve means to permit liquid to flow to and from the cylinder whenever the valve means controlling pneumatic pressure to said accumulators is actuated.

12. The combination as specified in claim 9 wherein said means to mount said inspection device for movement in said third path comprises a pivoting member movable about a pivot axis that is at substantially right angles to said key axis.

13. The combination as specified in claim 9 and an inspection device including mechanical components comprising positionable elements mounted on said means to mount an inspection device, and a manipulator arm mounted on said support assembly adjacent said inspection device, said manipulator arm being operable to adjust said positionable elements.

14. The combination of claim 9 and means to provide a readout from each of said electrical signal means at the same time an inspection signal is delivered by an inspection device mounted on said support assembly.

15. A support assembly for an inspection device for the wall of a chamber such as nuclear reactor pressure vessel having a key longitudinal axis and being substantially cylindrical, comprising mounting means, a first telescoping tube assembly, means to mount said first telescoping tube assembly to said mounting means to position the longitudinal axis of the first telescoping tube assembly substantially coinciding with said key longitudinal axis, power means to move said first telescoping tube assembly in direction along key longitudinal axis, first electrical signal means to indicate the position of the first telescoping tube assembly along said key axis with respect to a reference position, a support member, means to rotatably mount said support member to the first telescoping tube assembly for rotational movement about the longitudinal axis of said telescoping tube assembly, means to control rotational movement of said support member, second electrical signal means to indicate the position of said support member about the axis of said first telescoping tube assembly, a second telescoping tube assembly mounted on said support member in position whereby said second telescoping tube assembly has a movable end which moves in direction along an axis which is substantially perpendicular to the key longitudinal axis, means to control movement of said second telescoping tube assembly, third electrical signal means to indicate the position of said movable end of said second telescoping tube assembly relative to a reference point, means to mount an inspection device at the movable end of said second telescoping tube assembly, said first, second and third electrical signal means providing indication of the position of the means to mount said inspection device relative to the wall of the chamber.

* * * * *

UNITED STATES PATENT OFFICE
CERTIFICATE OF CORRECTION

Patent No. 3,780,571  Dated December 25, 1973

Inventor(s) Robert W. Wiesener

It is certified that error appears in the above-identified patent and that said Letters Patent are hereby corrected as shown below:

Column 12, line 33 first "comparison" should be left out. Column 13, line 41 "sand" should be --and--. Column 14, line 6 (Claim 18, line 18), after "means" insert --to pressurize--; Column 14, line 32 (Claim 19, line 18), before "chamber" insert --said--; Column 14, line 55 (Claim 8, line 2), before "wall" insert --having a chamber--. Column 15, line 5 (Claim 20, line 12), "member" should be --assembly--.

Signed and sealed this 11th day of June 1974.

(SEAL)
Attest:

EDWARD M. FLETCHER, JR.
Attesting Officer

C. MARSHALL DANN
Commissioner of Patents